Patented June 22, 1943

2,322,270

UNITED STATES PATENT OFFICE 2,322,270

THIAMIN CONTAINING COMPOSITIONS AND THEIR PRODUCTION

Lawrence Atkin and Alfred S. Schultz, Bronx, and Charles N. Frey, Scarsdale, N. Y., assignors to Standard Brands Incorporated, New York, N. Y., a corporation of Delaware No Drawing. Application March 24, 1939,
Serial No. 264,042

6 Claims. (Cl. 167—81)

The invention relates to a method for obviating destruction of thiamin (vitamin $B_1$) and to the product resulting therefrom. More particularly, the invention is concerned with the inhibition or retardation, of changes or reactions which lead to a decrease in thiamin potency, and includes correlated improvements and discoveries whereby properties of thiamin-containing compositions are maintained.

An object of the invention is the provision of a method whereby the thiamin content of a composition is stabilized.

A further object of the invention is to provide a method for inhibiting change in thiamin content of a composition, which method is readily applicable and lends itself to ready, effective and economical adaptation commercially.

A further object of the invention is to provide a method for maintaining thiamin potency in solutions, especially when in high dilution.

A more specific object of the invention is to provide a procedure whereby loss in thiamin potency is reduced, if not entirely inhibited, by combination of a gelatinous substance and a thiamin-containing composition.

Other objects of the invention will in part be obvious and will in part appear hereinafter.

The invention accordingly comprises the several steps and the relation of one or more of such steps with respect to each of the others, and the composition possessing the features, properties and the relation of constituents, which are exemplified in the following detailed disclosure, and the scope of the invention will be indicated in the claims.

In the practice of the invention the thiamin potency or content of a composition may be maintained by utilization of a substance which possesses the property of stabilizing the thiamin. The stabilization of thiamin potency is accomplished by inhibiting or reducing in large measure the changes which lead to a destruction or loss of thiamin. Such changes may be physical, as absorption and/or chemical, in which the thiamin molecule would undergo decomposition or change, which may be exidative or hydrolytic.

The inhibition of change in the thiamin, or stabilization of the thiamin content of a composition may be effected by including therein a gelatinous substance, preferably gelatin. It will be realized that gelatinous substance refers not only to gelatin but also to gums, as gum arabic, gum tragacanth, India gum, British gum, albumin, dextrins and modified starch which have the property of dissolving in water with subsequent formation of a glutinous mass or of swelling with water to form such a mass. Incorporation of the stabilizing agent or gelatinous substance may be effected at a desirable stage in the preparation of the thiamin-containing composition and preferably precedes placing the composition in a container. When thiamin is added, the stabilizer preferably is admixed prior to addition of the thiamin. Thus, if a solution of thiamin is being prepared, stabilizer, as gelatin, would be added to the water in the receptacle before the thiamin is added thereto, either as such or in the form of a solution. It has been shown, accordingly, that the inclusion of gelatin in such manner in a thiamin solution obviates loss thereof with maintenance of potency.

As illustrative of a manner in which the potency of thiamin-containing compositions may be maintained, specifically by the use of gelatin, the following examples are presented.

Example I

A solution containing sugar, salts, a buffer, nicotinic acid and yeast may be prepared, and the rate of fermentation of this solution compared with the rate in a like solution to which thiamin is added. The various materials may be as follows: a sugar and salt solution containing 200 grams chemically pure dextrose, 2.2 grams dihydrogen phosphate, 1.7 grams potassium chloride, 0.5 gram calcium chloride, 0.5 gram magnesium sulfate and about 10 milligrams each of ferric chloride and manganese sulfate per liter; a buffer solution containing 70 grams citric acid and 119 grams dipotassium phosphate per liter; an ammonium sulfate solution containing 150 milligrams per milliliter; a solution of nicotinic acid containing 1 milligram per liter; a yeast suspension containing 2 grams commercial bakers' yeast per 100 milliliters, and a thiamin solution containing 1 gamma (1 gamma=0.001 milligram) per milliliter.

When a solution containing the foregoing ingredients, with the exception of thiamin, was permitted to undergo fermentation in comparison with the same solution having an added thiamin content of 20 milligammas (1 milligamma=0.001 gamma or $10^{-9}$ grams), it was found that the fermentation in the solution containing the thiamin was about 60% faster than that of the solution containing no thiamin.

Example II

A solution may be prepared, as given in Example I, and the thiamin is added directly to a composition containing the various salts and yeast. When the fermentation rate of such a solution containing 20 milligammas of thiamin was observed and compared with a like solution to which a thiamin solution, prepared by dissolving the thiamin in distilled water was added, it was found that the potency of the thiamin, as demonstrated by the result in the first case, was about 20% greater than that shown by the results in the second case, thus evidencing a loss in potency of thiamin. When gelatin is incorporated into the water, prior to the addition of the thiamin, and the thus prepared thiamin introduced into the yeast-salt solution, it was found that there was no loss of thiamin, i. e., the potency was maintained. The gelatin may be utilized as a solution containing about 10 milligammas per millimeter, and when employed such solution may be first introduced into a suitable receptacle, as a flask, an amount of water added, and the whole shaken well before introduction of the thiamin.

The inclusion of a stabilizer, more particularly a gelatinous substance and specifically gelatin, in a thiamin-containing composition thus leads to a retention of the thiamin content or potency. Not only may the stabilizing substance be included in solutions of thiamin of various concentrations, especially those of relatively high dilution, but the incorporation may be with compositions or materials having a natural content of thiamin, or to which thiamin has been added for nutritive purposes, for example, various foods. Hence, the procedure lends itself especially to maintaining the potency of thiamin in many foods and tissues in which it is present in very low concentrations, for example, about 0.5 gamma per gram. Moreover, thiamin-containing solutions adapted for administration in order to supply thiamin deficiency may be maintained at a desired and predetermined potency through the inclusion therewith of a stabilizer, such as hereinbefore defined. Furthermore, the stabilizer may be a single material or an admixture of compatible materials.

Since certain changes in carrying out the above process, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A method for preparing a stable thiamin-containing solution, which comprises preparing an aqueous solution of gelatin and adding thiamin thereto, the amounts of gelatin and of thiamin being relatively small and the gelatin being present in a minor quantity with respect to the thiamin.

2. A composition of matter consisting of an aqueous solution containing gelatin in an amount of about 10 milligammas per milliliter to which thiamin has been added in an amount of about 1 gamma per milliliter.

3. A composition of matter consisting of an aqueous solution containing gelatin to which thiamin has been added, the gelatin and thiamin being present in relatively small amounts and the gelatin being present in a minor quantity with respect to the thiamin.

4. A method for preparing a stable thiamin-containing solution, which comprises preparing an aqueous solution of a gelatinous substance and adding thiamin thereto, the amounts of gelatinous substance and of thiamin being relatively small and the gelatinous substance being present in a minor quantity with respect to the thiamin.

5. A composition of matter consisting of an aqueous solution containing a gelatinous substance in an amount of about 10 milligammas per milliliter to which thiamin has been added in an amount of about 1 gamma per milliliter.

6. A composition of matter consisting of an aqueous solution of a gelatinous substance to which thiamin has been added, the gelatinous substance and thiamin being present in relatively small amounts and the gelatinous substance being present in a minor quantity with respect to the thiamin.

LAWRENCE ATKIN.
ALFRED S. SCHULTZ.
CHARLES N. FREY.